United States Patent [19]
Norris

[11] Patent Number: 5,115,489
[45] Date of Patent: May 19, 1992

[54] SPLICE TRAY

[75] Inventor: Stephen H. Norris, St. Albans, England

[73] Assignee: British Telecommunications public limited company, United Kingdom

[21] Appl. No.: 548,983

[22] PCT Filed: Feb. 27, 1989

[86] PCT No.: PCT/GB89/00202
§ 371 Date: Aug. 1, 1990
§ 102(e) Date: Aug. 1, 1990

[87] PCT Pub. No.: WO89/08276
PCT Pub. Date: Sep. 8, 1989

[30] Foreign Application Priority Data

Mar. 2, 1988 [GB] United Kingdom ................. 8805017

[51] Int. Cl.⁵ ............................ G02B 6/00; G02B 6/36
[52] U.S. Cl. .................................................. 385/135
[58] Field of Search ........................ 350/96.10-96.15, 350/96.20-96.22

[56] References Cited
U.S. PATENT DOCUMENTS 4,792,203 12/1988 Nelson et al. ................. 350/96.22 X
4,805,979 2/1989 Bossard et al. ............... 350/96.22 X
4,824,196 4/1989 Bylander ...................... 350/96.22 X
4,961,623 10/1990 Midkiff et al. ............... 350/96.23 X
4,971,421 11/1990 Ori .............................. 350/96.22 X Primary Examiner—Akm E. Ullah
Attorney, Agent, or Firm—Nixon & Vanderhye

[57] ABSTRACT

An optic fibre splice tray is provided with reels (3, 4) which can be moved towards and away from the outer walls (132, 133) of optic fibre compartments (1A, 1B) in order to hold the coiled optic fibres closely in position. This prevents kinks developing which could lead to light losses. Also, slots (58, 59, 60 and 61) are provided in the wall portions (56, 57) to enable an optic fibre (F1) to be conducted from one compartment to another and then to be joined (X) to another fibre (F2) which approaches the splice tray from the same direction. Unecessary bending of the optic fibres is again thereby avoided. A splice protector housing (44) is releasably attached to the lid (2) of the splice tray and removable link members (28, 29) are also provided which fit into apertures (34, 35, 36 and 37) of adjacent trays in a stack to enable the splice trays to be stacked without risk of breakage of an integral portion of any splice tray.

16 Claims, 4 Drawing Sheets

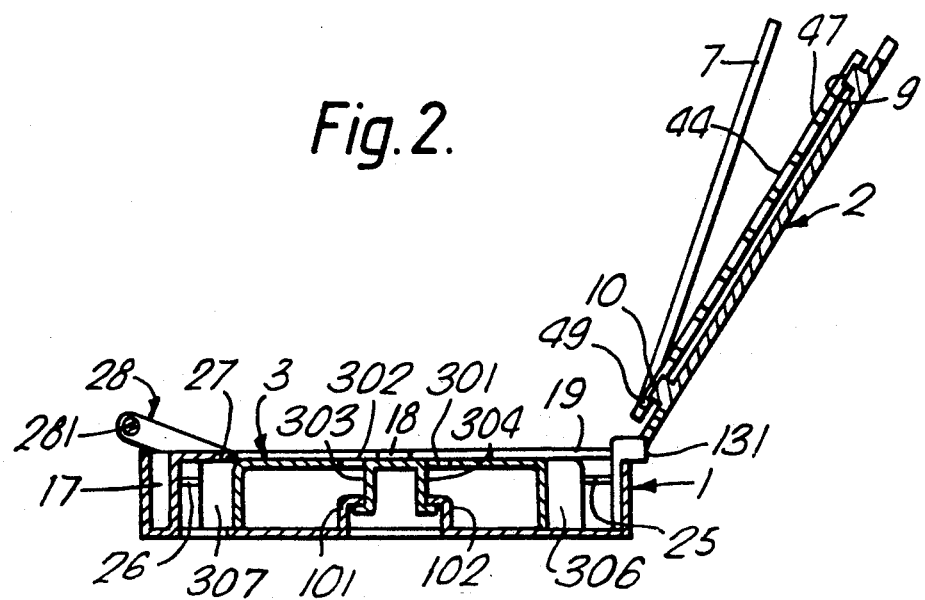
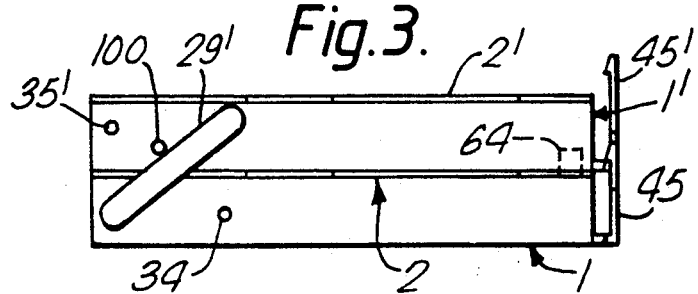
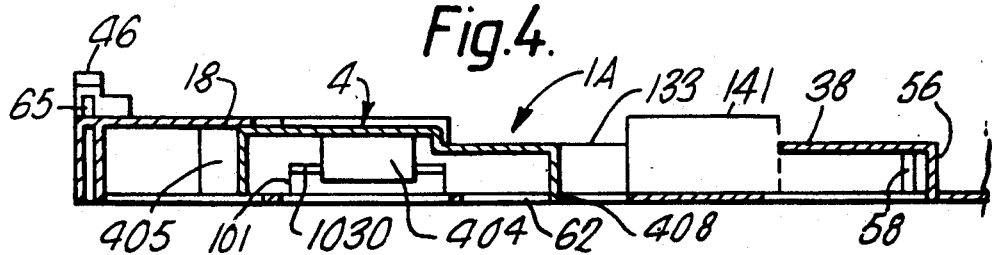
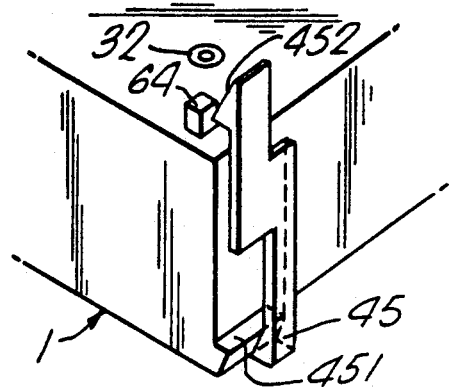

SPLICE TRAY

FIELD OF THE INVENTION

The present invention relates to splice trays for optic fibres.

BACKGROUND OF THE INVENTION

Splice trays are used for housing optic fibre joints, particularly in exchanges and typically comprise two spaced apart reels around which incoming optic fibres are coiled and a splice protector housing located intermediate the reels for locating and protecting an array of spliced joints formed between the ends of a multiplicity of optic fibres coiled on the reels. The reels serve to store spare lengths of the optic fibres and, if necessary, a short length of optic fibre can be unwound from a reel if it becomes necessary to form a new joint. The reels also ensure that kinks or undesirable bends of small radius of curvature do not occur in the optic fibres. Such bends or kinks are undesirable because they lead to light losses and thereby impair the efficiency of communication along the fibres.

A known splice tray manufactured by AT & T comprises two spaced-apart reel means defining respective generally annular or part-annular spaces for locating respective coiled optic fibres, and a splice protector housing for locating a spliced joint formed between such optic fibres.

SUMMARY OF THE INVENTION

It has now been found that under certain conditions, particularly when wavelengths such as 1550 nanometers are employed, such splice trays can cause appreciable light loss.

In one aspect the present invention is characterised in that at least one of said reel means is adjustable so as to enable the size of its generally annular or part-annular space to be varied.

By varying the size (normally its radial dimension) of the above-mentioned space, the coiled fibres on the reel means fit closely within the space irrespective of the thickness of the coil, which in practice will vary according to the number of optic fibres in the coil, the length of the coiled portion of each optic fibre and the thickness of the optic fibres. As a result, the tendency of the optic fibres to form slight bends or other deviations from a circular configuration is reduced significantly. Since an incoming optic fibre will typically form a coil of ten turns or more around its reel, even slight deviations from a smooth curvature of the optic fibre in the splice tray will lead to significant accumulative light losses. The invention enables such light losses to be reduced significantly.

Preferred features of this aspect of the invention are defined in dependant claims 2-4.

In another aspect, the invention is characterised by slot means formed in adjacent respective portions of the reel means, said slot means being so located as to enable an optic fibre coiled round one said reel means to extend via said slot means to the other reel means to coil round the other reel means and to join another optic fibre coiled round the first mentioned reel means at a spliced joint in said splice protector housing.

This feature has the advantage that two optic fibres entering the splice tray from the same direction through a common aperture may be joined. In the prior art splice tray referred to above, in order to join two optic fibres approaching the splice tray from the same direction, one of them must be bent to enter the splice tray through another aperture to enable the fibres to be joined. Such bending is undesirable and may lead to light losses.

Preferred features of this aspect of the invention are defined in claims 6, 7 and 8.

The known splice tray referred to above, which comprises two spaced-apart reel means defining respective spaces for locating respective coiled fibres, and a splice protector housing for locating a spliced joint formed between such optic fibres, also comprises means for locating another such splice tray thereon.

In another aspect, the present invention is characterised in that said locating means comprises at least one detachable link member, one end of which fits to a co-operating part of the splice tray body and the other end of which is adapted to fit a co-operating part of a similar splice tray body.

It has been found difficult to design robust locators to enable splice trays to be stacked on top of one another. If a locator is broken, then the entire splice tray must be scrapped, which is clearly uneconomical and creates significant technical and operational difficulties. This aspect of the invention has the advantage that the detachable link member may be made the weakest item in the locating means, ensuring that if any item breaks, it is the link member, which can be replaced inexpensively without affecting system operation.

Preferred features of this aspect of the invention are defined in dependant claims 10, 11 and 12.

The prior art splice tray referred to above comprises a box portion having two spaced-apart reel means defining respective spaces for locating respective coiled optic fibres, a lid portion hinged to said box portion, and a splice protector housing located on said lid portion for locating a spliced joint formed between such optic fibres, said splice protector housing comprising a base and a lid mounted on said base.

In another aspect, the present invention is characterised in that said base is detachable from said lid portion of the splice tray.

At present, optic fibre joints are protected by tubular splice protector sleeves and such splice protectors are in turn protected within the splice protector housing of a splice tray. It is now envisaged that new forms of splice protector and/or new jointing methods will be introduced in due course, which will require a different type of splice protector housing. This aspect of the invention will enable joints to be re-made incorporating such new splice protectors without replacing the entire splice tray installation.

Preferred features of this aspect of the invention are defined in dependant claims 14 and 15. A further preferred feature of the invention is defined in dependant claim 16.

BRIEF DESCRIPTION OF THE DRAWING

A preferred embodiment of the invention is described below, by way of example only, with reference to FIGS. 1 to 5 of the accompanying drawings, of which:

FIG. 2 is a section taken on II—II of FIG. 1;

FIG. 3 is an end elevation of a stack of two of the splice trays shown in FIG. 1;

FIG. 4 is a section taken on IV—IV of FIG. 1;

FIG. 5 is a perspective view of the right hand locator clip 45 of the splice tray of FIG. 1;

DETAILED DESCRIPTION OF THE DRAWINGS

Figure 1:
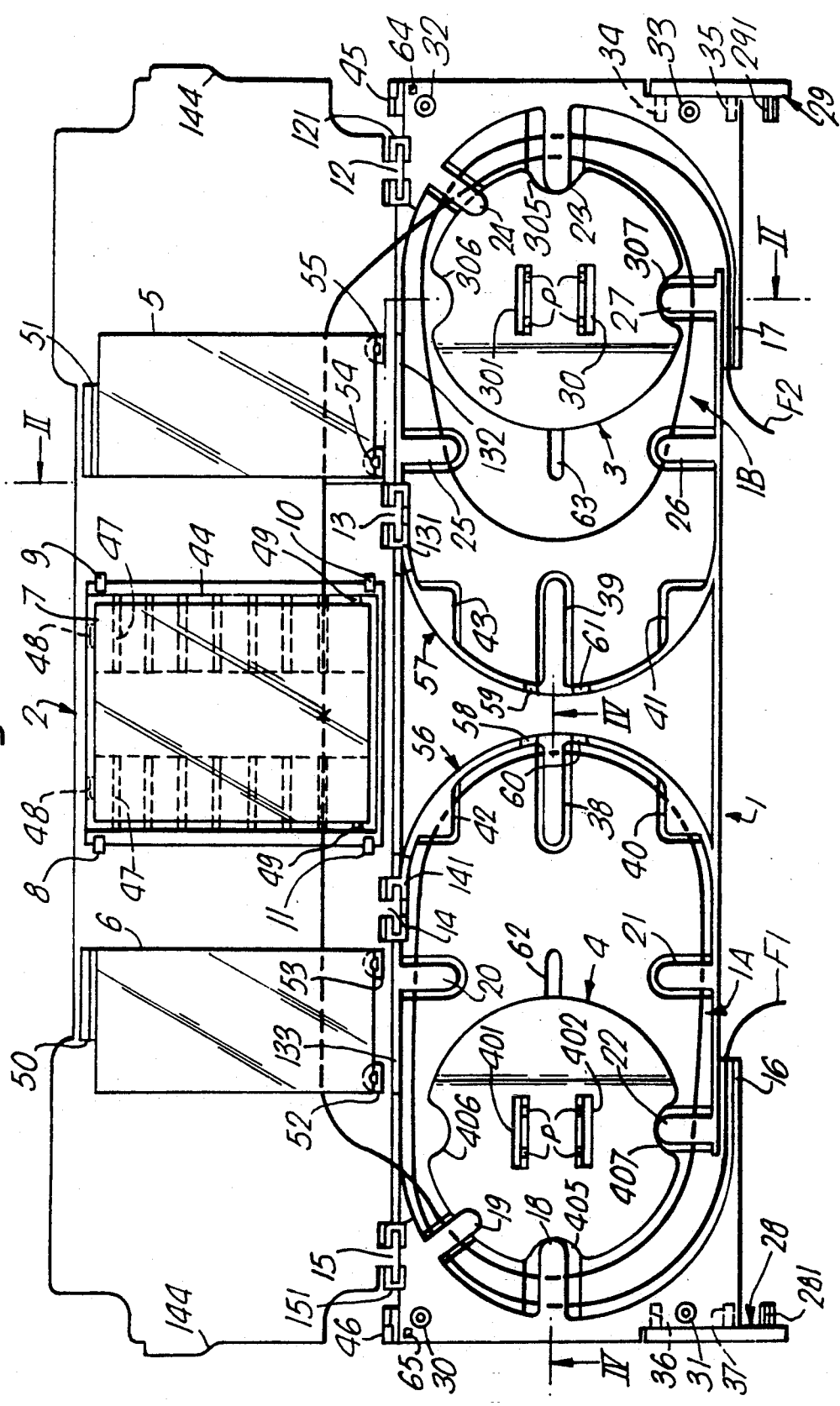
FIG. 1 is a plan view of an opened splice tray in accordance with the present invention.

Referring to FIG. 1, the splice tray shown comprises a body or box portion 1 having a lid 2 attached by hinge portions 12, 13, 14 and 15 to respective hinges 121, 131, 141 and 151 of the body portion. The body portion 1 incorporates two compartments 1A and 1B and reels 3 and 4 are located within these compartments so as to define at their outermost ends curved channels (constituting annular spaces of the present invention), which receive optic fibres F1 and F2 which enter through respective apertures 16 and 17. Only about 1.5 turns of each optic fibre are shown in the two compartments, but in practice typically 24 optic fibres will enter each compartment and will each have some two meters coiled round the reel (which should not be less than 80 millimeters in diameter for a transmission wavelength of 1550 nanometers). Thus, there will typically be approximately 48 meters of clad optic fibre coiled in each compartment. As shown in FIG. 1, the free ends of the optic fibres F1 and F2 are fed to a splice protector housing comprising a base 44 clipped to lid 2 by clips 8, 9, 10 and 11 and having a lid 7 hinged thereto at 49 and clipped shut by clips 48. Optic fibre F1 is held against lid 2 by a plate 6 which is removably clipped to the lid by clips 50, 52 and 53 and optical fibre F2 is held against lid 2 by a plate 5 which is similarly clipped to lid 2 by clips 51, 54 and 55. Base 44 of the splice protector housing is provided with two rows of grooves 47 to enable typically 24 spliced joints to be housed. Only one such spliced joint (indicated at X) is shown, for the sake of clarity.

As will be described in more detail below, reels 3 and 4 (which are not rotatable) can be moved towards or away from each other to expand or contract the radial dimension of the part curved channel at the outermost end of each compartment 1A and 1B. Accordingly, the coiled optic fibres in the outermost portion of each compartment are held closely between each reel 3 or 4 and the outer wall 132 or 133 of the compartment. The innermost wall portions 56 and 57 are however located some distance from the reels 4 and 3, even when the latter are located at their innermost positions. Accordingly the length of the final turn of each optic fibre may be varied by running the optic fibre either close to the innermost wall (e.g. as shown in the case of optic fibre F1 which is located closely against wall 56) or maybe wound closer to the reel (as shown for example in the case of optical fibre F2). In each case the optic fibre is prevented from riding up from the base of body portion 1 by inwardly extending fingers 18, 19, 20, 21, 38, 40 and 42 (compartment 1A) or 23, 24, 25, 26, 27, 39, 41, and 43 in the case of compartment 1B. The fingers 20, 21, 38, 40 and 42 are coplanar with the fingers 25, 26, 43, 39 and 41 and are located at a lower level than the coplanar fingers 18, 19, 22, 23, 24, and 27 in order to accommodate the components mounted on lid 2 when the latter is closed.

It will be noted that in the arrangement shown in FIG. 1, optic fibre F1 enters channel 16 in the opposite direction to optic fibre F2 which enters channel 17.

Figure 1A:
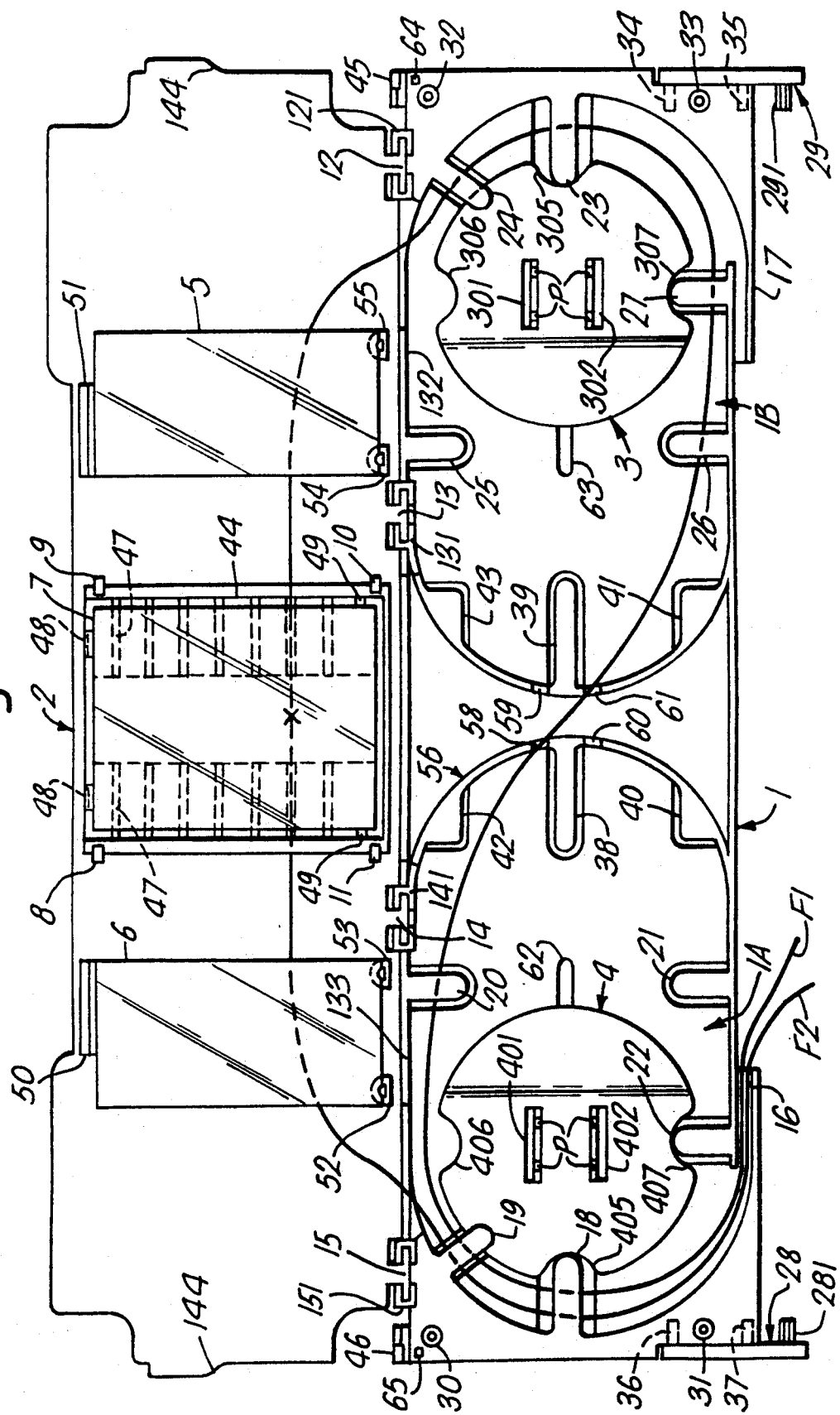
FIG. 1A is a plan view of the same splice tray but showing a different configuration of optic fibres therein.

FIG. 1A shows an alternative arrangement of optic fibres which both enter channel 16. It will be seen that optic fibre F1 is conducted through slots 58 and 61 from compartment 1A to 1B before being wound round reel 3 to meet optic fibre F2 in the splice protector housing 44, 7 a similar pair of slots 59 and 60 are provided in wall portions 56 and 57 respectively to conduct an optic fibre from one compartment to the other when wound in the reverse direction. In practice, each optic fibre will be wound several times round reel 4 and optic fibre F1 may also be wound several times round reel 3 but these extra turns have been omitted for the sake of clarity.

The reels 3 and 4 are identical and are each provided with three indentations 305, 306, 307, and 405, 406, 407 in order to avoid fouling the fingers 23, 27 and 18, 22 on removing the reels from the body 1. The reels 3 and 4 may be moved sufficiently far inwards to avoid fouling fingers 24 and 19 respectively. As shown in FIG. 1, reel 3 has two apertures 301, and 302 and reel 4 has two similar apertures 401 and 402. Referring to FIG. 2, which shows reel 3, resilient leg portions 303 and 304 extend downwardly from the innermost peripheries of these apertures and have outwardly turned portions which engage upstanding leg portions 101 and 102 of body portion 1 respectively. These leg portions 101 and 102 are cut away in FIGS. 1 and 1A for the sake of clarity to reveal upwardly extending projections P(1 and 1A) which engage corrugated surfaces 1030 (FIG. 4) and thereby enable reels 3 and 4 to be shifted towards and away from one another in ratchet fashion and hold the reels 3 and 4 onto the surface of body portion 1. By squeezing leg portions 303 and 304 together, the reel 3 (and similarly reel 4) can be removed from the body portion 1 which allows replacement of a reel with (e.g.) a reel of a differing size or profile. It will be seen from FIG. 4 that each reel carries a projection 408 which extends into a channel 62 (reel 4) or 63 (reel 3) as shown in FIGS. 1A and 1B in order to locate the reels. It will also be seen from FIG. 4 that the wall 133 is cut away to accommodate panel 6 attached to lid 2 (FIG. 1).

As shown in FIGS. 1 and 1A, body portion 1 carries link members 28 and 29 at the opposite ends of its front portion which carry pins 281 and 291 respectively for engagement with holes 34, 35, 36 and 37 formed in body portion 1. As best seen in FIG. 2. each pin 281 is in the form of a split pin. Although not shown in the drawings, the tip of each split pin is expanded in order to enable each pin to clip into its aperture in body portion 1. As can be seen in FIG. 3, two splice trays can be stacked one on top of the other with each splice tray 1' being linked to a similar splice tray 1 beneath it by its diagonally orientated link members such as that shown at 29'. Separation of the splice trays is prevented by a stop member 100 which engages each link member. It will be apparent that the aperture 35' shown in FIG. 3 will receive a pin of a link member diagonally attached to a further splice tray (not shown) located on lid 2' of body portion 1'. Further attachment between the stacked splice trays is provided by clips 45 and 46 (FIG. 1) and upwardly extending projections 64 and 65 (FIG. 1), of which one projection and clip are shown in detail in FIG. 5. Each attachment clip 45, 46 comprises a projection 451 and carries a hook portion 452 which latches on to a similar projection formed in the body 1 of a splice tray (not shown) located on top of the body portion 1. The region of clip 45 round projection 1 is cut away to accommodate the hook portion (not shown) of a similar clip attached a further splice tray (not shown) located below the body portion 1 of FIG. 5. Each projection portion such as that shown in FIG. 5 at 64 locates against the interior corner of a body portion of a further splice tray (not shown) located thereon. The bottom splice tray in a stack may be screwed to a suitable support surface through countersunk holes 30, 31, 32 and 33 (FIG. 1) of which only hole 32 is shown in FIG. 5. Engagement of two clips 45, 45' is also illustrated in FIG. 3.

As can be seen in FIG. 1, portions 144 of lid 2 are shaped to engage pins 281 and 291 of link members 28 and 29 when the latter are swung upwardly and the lid 2 is nearly closed. In this position the lid is supported by the link members 28 and 29 in a partially open position to enable the configuration of the optic fibres to be viewed before the lid 2 is completely closed. This enables inspection of the optic fibres before the lid 2 is completely shut.

Figure 6:
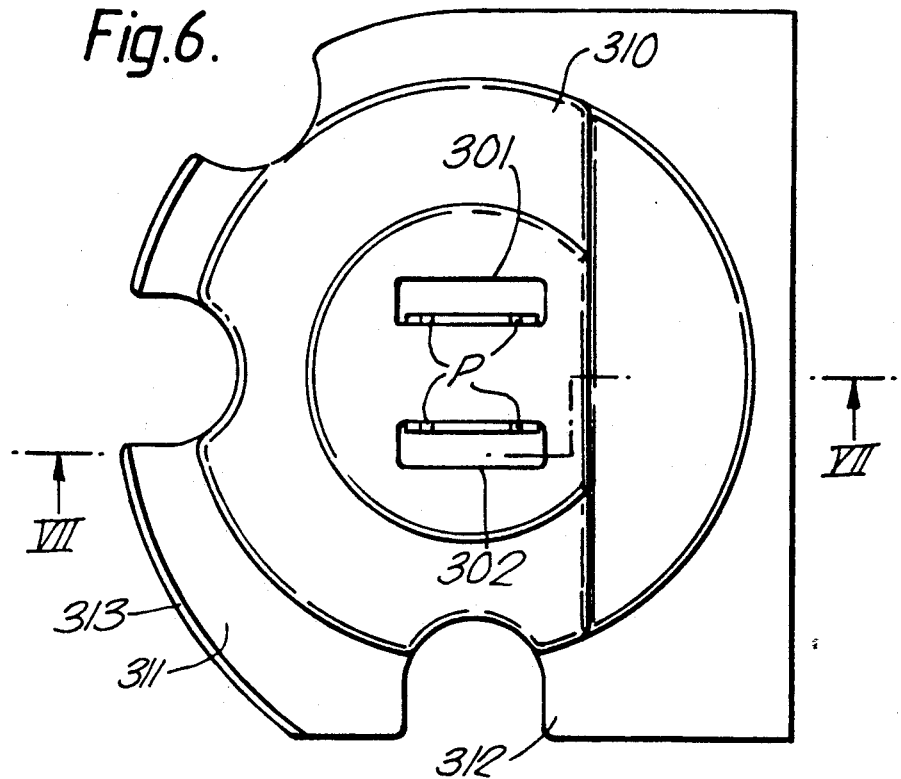
FIG. 6 is a plan view of an alternative reel for use in the tray of FIG. 1.
Figure 7:
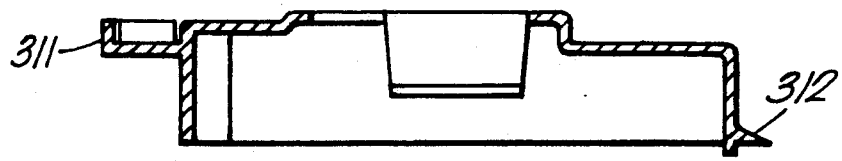
FIG. 7 is a section taken on VII—VII of FIG. 6.
Figure 8:
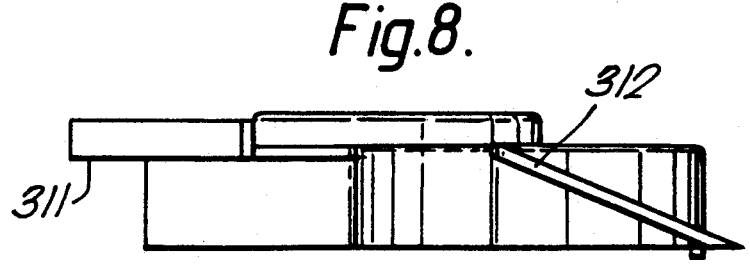
FIG. 8 is a side view of the reel of FIG. 6.

Referring now to FIGS. 6, 7 and 8 one particular modified reel 310 for use in the tray of FIG. 1 is arranged to provide additional protection to very fine optic fibres, in particular of the kind sometimes called primary coated fibres.

Primary coated fibres are of much smaller diameter than fully coated fibres and accordingly require less depth in the tray compartment. However, provision of a "standard" depth tray may be necessary if, say, primary coated fibres are to be joined to fully coated fibres. In such circumstances the distance between the tray base where the fibre is stored and the lid where joints are stored may result in an unacceptable path being taken by such a fibre.

To avoid this the reel 310 carries an extension plateau 311 arranged to support the fibres towards the outer edge of the compartment to reduce the distance between the storage compartment and the lid. A further extension 312 slopes from the base of the storage compartment to the extension 311, the slope being arranged to prevent unacceptable curvature of fine optic fibres stored in that compartment.

The extensions 311, 312 are shaped to extend out to the edges of the compartment in the reel area to prevent fibres falling off the side. The extension 311 also includes a wall 313 so that if the reel 310 is away from the side edge of the tray fibres are again retained.

At the forward edge of the reel the extension 312 is arranged to terminate very slightly above the surface of the storage compartment to allow a fibre (e.g. F1 of FIG. 1) to have a first turn at the base of the tray to enter the storage compartment prior to sloping up extension 312 and around the reel on the plateau 311.

It will be appreciated that either or both of reels 3 and 4 may be replaced with a reel of the kind represented by the reel 310.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

I claim:

1. A splice tray for optic fibres (F1, F2) comprising two spaced-apart reel means (3, 4) defining respective at least part-annular spaces (1B, 1A) for locating respective coiled optic fibres (F2, F1) and a splice protector housing (44, 7) for locating a spliced joint (X) formed between such optic fibres, characterised in that at least one of said reel means (3, 4) is adjustable so as to enable the size of its at least part-annular space (1A, 1B) to be varied.

2. A splice tray as claimed in claim 1 further characterised in that at least one member (3, 4) defining a wall of the said at least part-annular space is detachable.

3. A splice tray as claimed in claim 1 or claim 2 further characterised in that said at least one reel means (3, 4) comprises a reel member around which, in use, an optic fibre (F1, F2) is coiled, said reel member being located on a body (1) of the splice tray for sliding movement towards and away from the other said reel means, separation of the reel member from said body normally being prevented by engagement of opposed surfaces (P1030) of the reel member and said body respectively, at least one of said surfaces (P) being a surface of a resilient portion (303, 304, 404) of one of the reel members (3, 4) and said body which resilient portion is deformable to release said engagement, at least one of said surfaces (1030) being corrugated so as to tend to maintain said reel member in its adjusted position.

4. A splice tray as claimed in claim 3 further characterised in that said reel member (3, 4) is in the form of a hollow shell and two such resilient portions (303, 304) are provided in the form of resilient legs extending within a reel member from one of the reel members (3) and said body towards the other of the reel members and said body.

5. A splice tray for optical fibres comprising two spaced-apart reel means (3, 4) defining respective at least part-annular spaces (1B, 1A) for locating respective coiled optic fibres (F2, F1) and a splice protector housing (44, 7) for locating a spliced joint (X) formed between such optic fibres, characterised by said reel means (3, 4) being provided with respective compartments (1B, 1A), adjacent wall portions (57, 56) of the respective compartments each having two slots (59, 61, 58, 60) formed therein so as to enable an optic fibre (F1) coiled round one reel means (4, 3) in one direction to extend via one of two pairs of said slots (58, 61/59, 60) to the other reel means (3/4) and be coiled round said other reel means in the opposite direction.

6. An optical fibre junction arrangement comprising a splice tray as claimed in claim 5, and further including a first optic fibre (F1) coiled round one reel means (4), extending via said slot means (58, 61) to the other reel means (3), coiled round the other reel means and joined within said splice protector housing (44, 7) to another optic fibre (F2) which is coiled round said one reel means.

7. An optical fibre junction arrangement as claimed in claim 6 where the splice tray comprises respective entrance apertures (16, 17) for said reel means, the arrangement being further characterised in that both said optical fibres (F1, F2) enter said splice tray through one of said entrance apertures (16).

8. A splice tray for optic fibres comprising two space-apart reel means (3, 4) defining respective spaces (1B, 1A) for locating respective coiled optic fibres, a splice protector housing (44, 7) for locating a spliced joint (X) formed between such optic fibres, and means (28, 29, 64, 65, 45, 46) for locating another such splice tray thereon, characterised in that said locating means (28, 29, 64, 65, 45, 46) comprises at least one detachable link member (28, 29) one end of which fits to a co-operating part (36, 34) of the splice tray body (1) and the other end of which (281, 291) is adapted to fit a co-operating part of a similar splice tray body (1), each said link being rotatable about its associated said co-operating part (36, 34) so as to prop a lid (2) of the splice tray in a partially open position.

9. A splice tray for optic fibres comprising two spaced-apart reel means (3, 4) defining respective spaces (1B, 1A) for locating respective coiled optic fibres, a splice protector housing (44, 7) for locating a spliced joint (X) formed between such optic fibres, and means (28, 29, 64, 65, 45, 46) for locating another such splice tray thereon, characterised in that said locating means (28, 29, 64, 65, 45, 46) comprises at least one detachable link member (28, 29) one end of which fits to a co-operating part (36, 34) of the splice tray body (1), and the other end of which (281, 291) is adapted to fit a co-operating part of a similar splice tray body (1), and in that said at least one link member (28, 29) carries two pin portions (281, 291) at its respective ends, said pin portions extending orthogonally to the link member on one side thereof, said co-operating parts being locating apertures (34, 35, 36, 37) shaped and dimensioned to receive said pin portions.

10. A splice tray as claimed in claim 9 further characterised in that the or each link member (28, 29) is rotatable about its associated said co-operating part (36, 34) so as to prop a lid (2) of the splice tray in a partially open position.

11. A splice tray as claimed in claim 9 further characterised in that said pin portions (281, 291) are split and are expanded at their tips to enable the said pin portions to clip into said apertures (34, 35, 36, 37).

12. A splice tray for optic fibres comprising a box portion (1) having two spaced-apart reel means (3, 4) defining respective spaces (1B, 1A) for locating respective coiled optic fibres, a lid portion (2) hinged to said box portion, and a splice protector housing (44, 7) located on said lid portion for locating a spliced joint (X) formed between such optic fibres, said splice protector housing comprising a base (44) and a lid (7) mounted on said base characterised in that said base (44) is detachable from said lid portion (2) of the splice tray.

13. A splice tray as claimed in claim 12 further characterised in that said lid (7) of the splice protector housing (44, 7) is detachable from said base (44).

14. A splice tray as claimed in claim 12 or claim 13 further characterised in that said base (44) is releasably attached to said lid portion (2) by at least one resilient clip 8, 9, 10, 11).

15. A splice tray as claimed in claims 1, 2, 5, 8, 9, 10, 12 or 13 further characterised by at least one locating clip, (45, 46) each comprising a resilient member (45) extending substantially parallel to a wall of the splice tray from a projection (451) therefrom and carrying at its distal end an inwardly extending hook portion (452) spaced from said projection a distance equal to the thickness of the splice tray whereby in use said hook portion engages a similar said projection of another such splice tray (7) in a stack of such splice trays (FIG. 3) and the region of said resilient member around said projection being cut away to enable said projection to be engaged in use by a similar hook portion of a further such splice tray in a stack.

16. A splice tray as claimed in claims 1, 2, 5, 8, 9, 10, 12 or 13 further characterised in that at least one of said reel means (3, 4) includes an extension portion (311, 312) sloped to provide a path which, in use, causes an optic fibre (F1, F2) to follow an acceptable route from a point towards a storage area (1B, 1A) of the tray to a point towards a splice protection area (44, 7) of the tray.

* * * * *